3,282,104
CAPACITANCE LEVEL GAUGE HAVING PLURAL
SENSORS OF DIFFERING CAPACITANCE
John J. Exon, Fridley, Minn., assignor to Honeywell Inc., a corporation of Delaware
Filed Dec. 19, 1963, Ser. No. 331,883
4 Claims. (Cl. 73—304)

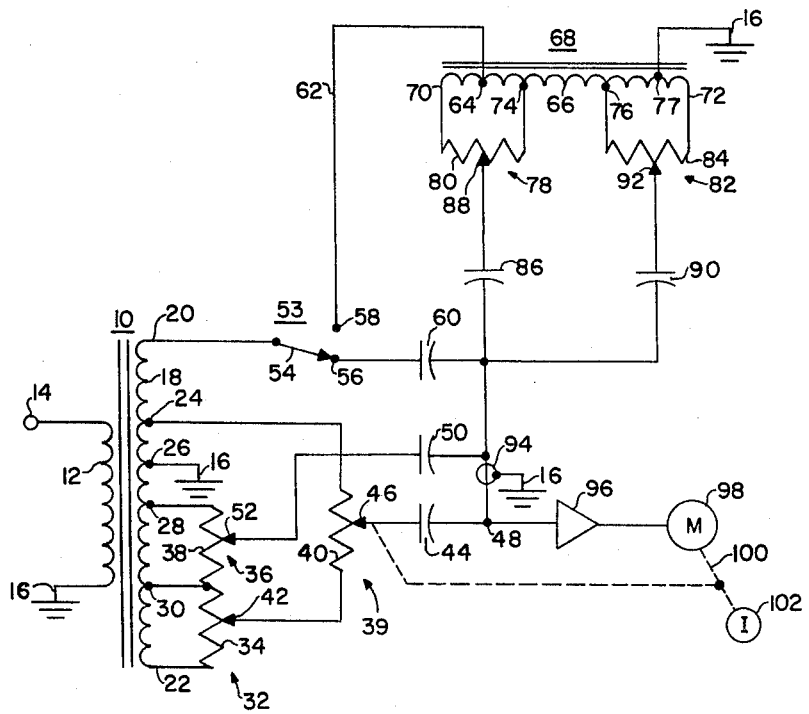

This invention relates generally to fuel gauging apparatus and more particularly to fuel gauging apparatus in which the condition sensors have different impedance changes per unit of fuel change.

Normally fuel gauge systems use condition sensing capacitors which, while of different shapes and sizes, all have the same capacitance or signal change per unit of fuel change. In some instances however the requirements are such that capacitors with different capacitance changes per unit of fuel change are required. These arise where the tanks are of extremely different shapes one with respect to the other or where a customer requires that a new fuel gauge system be set up using, as part of the system, previously built capacitive sensors in combination with new sensors.

The present invention solves the problem of using capacitive sensors with different sensitivities. The problem is solved by using a multiple pole switch to effectively connect one of the condition sensors to one or more autotransformers whose output can be adjusted in combination with the condition sensor to either increase or decrease the sensor output with respect to the signal from the original capacitive sensor. After an initial setting, selective indication can be obtained from any of the tank units regardless of the sensor sensitivity.

It is therefore an object of this invention to provide apparatus for selective indication from a plurality of fuel gauge tank units some of which have a sensitivity different from tank units to be used as a primary or reference condition sensor.

Further objects and advantages of this invention are readily ascertainable upon a reading of the specification and appended claims in conjunction with the single figure which is a circuit diagram of the invention.

While specific terminology will be resorted to for purposes of clarification, it is to be understood that all equivalents are to be included within this terminology. In other words, while capacitors will be referred to as the condition sensors, in this description of the invention it is to be realized that other types of condition sensors may very well be used and still perform the invention. If variable resistors are the sensors and selective indication of sensors of different sensitivities is desired, this same technique of using autotransformers for supplying signals can be used.

A transformer or power supply means 10 is shown with a primary winding 12 connected between input terminal 14 and ground 16. The transformer 10 has a secondary winding 18 with end leads 20 and 22 and also has taps 24, 26, 28, and 30. A first potentiometer generally designated as 32 has a resistance element 34 connected between lead 22 and tap 30. A potentiometer or variable resistance means 36 has a resistance element 38 connected between taps 28 and 30. If it is so desired, a single potentiometer with two wipers may be used to replace potentiometers 32 and 36. Ground or reference potential 16 is connected to tap 26. Lead 20 and tap 24 supply a first phase signal with respect to ground tap 26 while the opposite phase is supplied by the other lead 22 and taps 28 and 30. A variable resistance means or potentiometer 39 has a resistance element 40 connected between tap 24 and a wiper 42 of the variable resistance means 32. A capacitor or impedance means 44 is connected between a wiper 46 of the potentiometer 39 and a summing means or junction point 48. A capacitive means or impedance means 50 is connected between a wiper 52 of the potentiometer 36 and the summing means 48. A multiple pole switch means generally designated as 53 has a movable contact 54 permanently connected to lead 20. The movable contact 54 is shown connected electrically to terminal 56. The switch 52 also has another contact labeled 58 to which the movable contact 54 is not presently connected. A tank unit, condition sensing element, or impedance means 60 is connected between contact 56 and summing means 48. A lead 62 connects the contact 58 to a tap 64 on a winding 66 of an autotransformer or variable signal converting means generally designated as 68. The winding 66 also has ends 70 and 72 and additional taps 74, 76, and 77. A variable resistance means or potentiometer generally designated as 78 has a resistance element 80 connected between end 70 and tap 74. A variable resistance means or potentiometer 82 has a resistance element 84 connected between end 72 and tap 76. Ground 16 is connected to the tap 77 located between end 72 and tap 76. A tank unit or condition sensor 86 having a sensitivity or capacitance per unit of fuel different from that of tank unit 60 is connected between a wiper 88 of potentiometer 78 and the summing means 48. A reference capacitor or impedance means 90 is connected between a wiper 92 of potentiometer 82 and the summing means 48. A shield 94 is connected to ground 16 and electrostatically protects all the leads which are directly connected to the summing point 48. The summing point 48 is also connected to an input of an amplifier, summing amplifier or amplifying means 96. An output of amplifier 96 is connected to a motor means or rebalance means 98. A mechanical connection means designated as 100 connects the output of motor 98 to an indicator 102 and also to the wiper 46 to rebalance this wiper in accordance with an input signal to the amplifier 96.

In discussing the operation of the circuit shown, it is easier to discuss the current flow or current change per unit of fuel change than it is to discuss capacitance change per unit of fuel. This is true because a small capacitance with a large voltage may produce the same effect on the amplifier 96 as will a large capacitance and a smaller voltage. As shown, the indicator is providing an indication of the fuel level between the plates of capacitor or tank unit 60. The circuit is adjusted so that the current flow through capacitor 50 is equal to the current flow through tank unit 60 when tank unit 60 is in an empty condition. The current flow through capacitor 44 is equal to the current flow through tank unit 60 due to the fuel between the plates of this capacitor. As is realized by those skilled in the art, the fuel between the plates of capacitor 60 will increase the capacitance thereof and allow greater current flow. This greater current flow provides an input to amplifier 96 and this input will turn motor 98 to readjust the wiper 46 on potentiometer 39 and produce a current through capacitor 44, which will minimize the effect of the increased current flow through capactior 60 to the amplifier 96. A more complete description of operation can be obtained from a Franzel et al Patent 3,037,-385, issued June 5, 1962, to the same assignee as the present invention.

If indication is now desired of the amount of fuel present between the electrodes of capacitor or tank unit 86, the switch 53 is changed so that the movable contact 54 electrically connects the end 20 of secondary winding 18 to the contact 58. If the capacitance per unit of fuel in capacitor 86 is larger than the capacitance per unit of fuel in tank unit 60, the wiper 88 will have to be set so that there is less voltage applied to tank unit 86. If however the tank unit 86 has a smaller capacitance change per unit of fuel change than tank unit 60, the wiper 88 will have to be adjusted so that more voltage is applied to tank unit 86. If the empty tank capacitance of capacitor 86 is greater than the empty tank capacitance of tank unit 60, the wiper 92 of potentiometer 82 which is connected to reference capacitor 90 will have to be adjusted to provide current flow of the same phase as is applied through capacitor 50. This adjustment will have to be made to counteract the increased empty condition capacitance. If however, the empty tank capacitance of tank unit 86 is less than capacitor 60, the wiper 92 will be adjusted so that more current of the same phase as is applied through capacitor 86 flows through capacitor 90 to in effect pad the capacitor 86 to the same total capacitance or current flow therethrough in the empty condition as is obtained from tank unit 60 when it is in the empty condition.

As will be realized, many separate autotransformer units and condition sensors may be used by merely increasing the number of positions for switch 52 and appropriately connecting these transformers along with the capacitive tank units and their so-called padder capacitor. In this way selective indication may be obtained from many different tank units each of which has a different capacitance per unit of fuel.

As will be realized, the invention is not in the specific type of fuel gauge shown but merely in the utilization of a means for supplying power to separate sets of capacitors or other condition sensors while using the same basic rebalance system and adjusting the current flow through these sensors so that the terminal conditions are still registered on the indicator. Also, the invention is useful in totalizing applications where the switch 53 is eliminated and all the condition sensors are connected to provide signals simultaneously. With this in mind, it is to be realized that this invention includes solid state rebalance systems as well as the mechanical rebalance system which is shown. I therefore wish to be limited not by the specification or the circuit as described, but only by the scope of the appended claims.

I claim as my invention:

1. Fuel gauge apparatus involving selective fuel quantity indication of a plurality of tanks wherein the tank measuring capacitors have at least two fuel quantity per capacitance relationships comprising, in combination:

first transformer means including primary and secondary winding means;

reference potential means connected to a tap on said secondary winding means of said first transformer means;

summing amplifier means including input means and output means;

switch means connected to one end of said secondary winding means of said first transformer means, said switch means selectively connecting a plurality of output contacts to said secondary winding means for receiving a first signal of a first phase therefrom;

first means for supplying a second signal of a phase opposite said first phase, said first means being connected to said secondary means of said transformer means;

reference first capacitive means connected between said first means and said input means of said summing amplifier means;

tank unit second capacitive means connected between one of said plurality of said output contacts on said switch means and said input means of said amplifier means;

second transformer means connected between another of said plurality of output contacts of said switch means and said reference potential means, said second transformer means including first and second variable potential outputs;

tank unit third capacitive means connected between said first output of said second transformer means and said input means of said amplifier means;

reference fourth capacitive means connected between said second output of said second transformer means and said input means of said amplifier means;

means connected between said output means of said amplifier means and said input means of said amplifier means for applying a rebalance signal thereto for minimizing the effective input signal applied to said amplifier means; and indicator means connected to said output means of said amplifier means.

2. Fuel gauge apparatus including selective fuel quantity indication of a plurality of tanks having at least two fuel quantity sensitivity relationships comprising, in combination:

first transformer means including primary and secondary winding means;

reference potential means connected to a tap on said secondary winding means of said first transformer means;

summing means including input means and output means;

switch means connected to one end of said secondary winding means of said first transformer means, said switch means selectively connecting a plurality of output contacts to said secondary winding means for receiving a first signal of a first phase therefrom;

first means for supplying a second signal of a phase opposite said first phase, said first means being connected to said secondary means of said transformer means;

reference first capacitive means connected between said first means and said input means of said summing means;

tank unit second capacitive means connected between one of said plurality of said output contacts on said switch means and said input means of said summing means;

second transformer means connected between another of said plurality of output contacts of said switch means and said reference potential means, said second transformer means including first and second variable potential outputs;

tank unit third capacitive means connected between said first output of said second transformer means and said input means of said summing means;

reference fourth capacitive means connected between said second output of said second transformer means and said input means of said summing means;

means connected between said output means of said summing means and said first means for applying a rebalance signal to said input means of said summing means for minimizing the effective input signal applied to said summing means; and indicator means connected to said output means of said summing means.

3. Fuel gauge apparatus including selective fuel quantity indication of a plurality of tanks wherein the tank measuring sensors have at least two different sensitivities comprising, in combination:

first transformer means including primary and secondary winding means;

reference potential means connected to a tap on said secondary winding means of said first transformer means;

summing means including input means and output means;

switch means connected to one end of said secondary winding means of said first transformer means, said switch means selectively connecting a plurality of output contacts to said secondary winding means for receiving a first signal of a first phase therefrom;

first means for supplying a second signal of a phase opposite said first phase, said first means being connected to said secondary means of said transformer means;

first reference means connected between said first means and said input means of said summing means;

first tank sensor means connected between one of said plurality of said output contacts on said switch means and said input means of said summing means;

second transformer means connected between another of said plurality of output contacts of said switch means and said reference potential means, said second transformer means including first and second outputs;

second tank unit sensor means connected between said first output of said second transformer means and said input means of said summing means;

second reference means connected between said second output of said second transformer means and said input means of said summing means;

means connected between said output means of said summing means and said input means of said summing means for applying a rebalance signal thereto for minimizing the effective input signal applied to said summing means; and indicator means connected to said output means of said summing means.

4. Sensing apparatus including selective indication of a plurality of sensors wherein the sensors have at least two different sensitivity relationships comprising, in combination;

first transformer means including primary and secondary winding means;

reference potential means connected to a tap on said secondary winding means of said first transformer means;

summing means including input means and output means;

switch means connected to one end of said secondary winding means of said first transformer means, said switch means selectively connecting a plurality of output contacts to said secondary winding means for receiving a first signal or a first phase therefrom;

first means for supplying a second signal of a phase opposite said first phase, said first means being connected to said secondary means of said transformer means;

reference second means connected between said first means and said input means of said summing means;

sensor third means connected between one of said plurality of output contacts of said switch means and said reference potential means, said second transformer means including first and second outputs;

sensor fourth means connected between said first output of said second transformer means and said input means of said summing means;

reference fifth means connected between said second transformer means and said input means of said summing means; and means connected between said output means of said summing means and said input means of said summing means for applying a rebalance signal thereto for minimizing the effective input signal applied to said summing means.

References Cited by the Examiner

UNITED STATES PATENTS

| | | | |
|---|---|---|---|
| 2,289,202 | 7/1942 | McCoy | 73—304 X |
| 2,833,147 | 5/1958 | Di Franco | 73—304 |
| 3,208,280 | 9/1965 | Exon | 73—304 |

LOUIS R. PRINCE, *Primary Examiner.*

S. C. SWISHER, *Assistant Examiner.*